Feb. 3, 1959
G. ANSEL ET AL
2,872,037
MANDREL AND DIE
Filed May 21, 1954
2 Sheets-Sheet 1
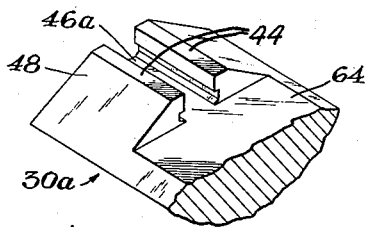
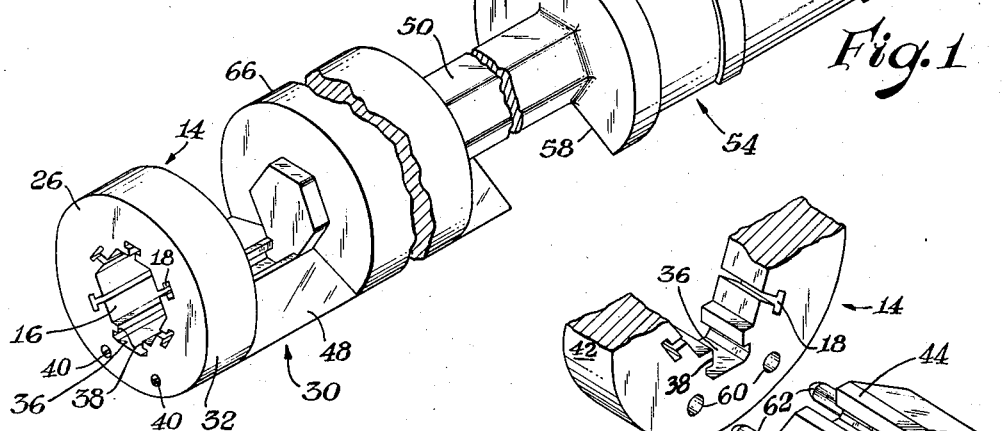
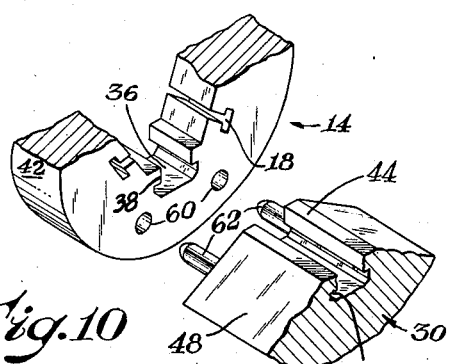
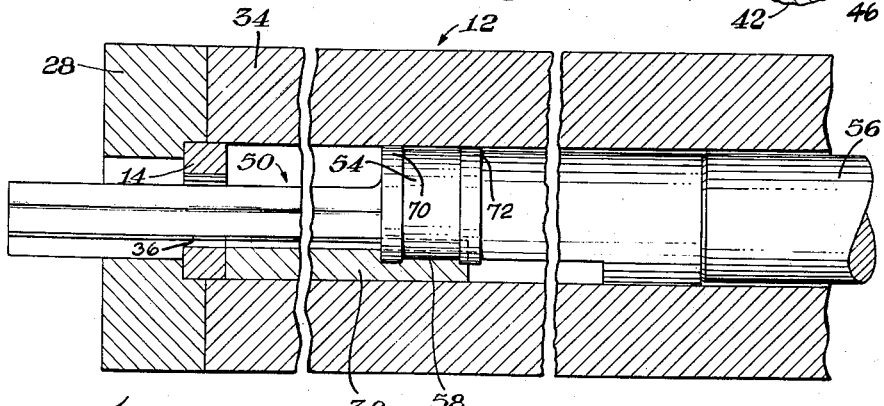
INVENTORS
Gerhard Ansel
Clifton J. Huffman
BY
Griswold & Burdick
ATTORNEYS.

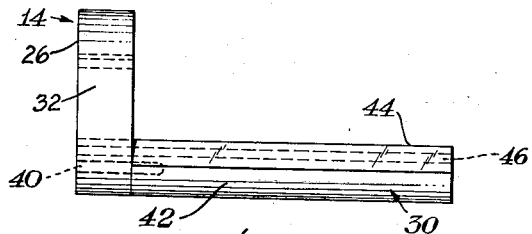
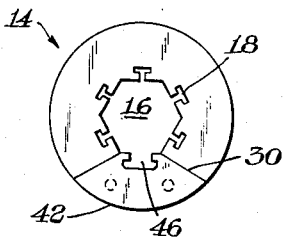
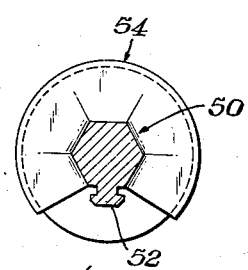
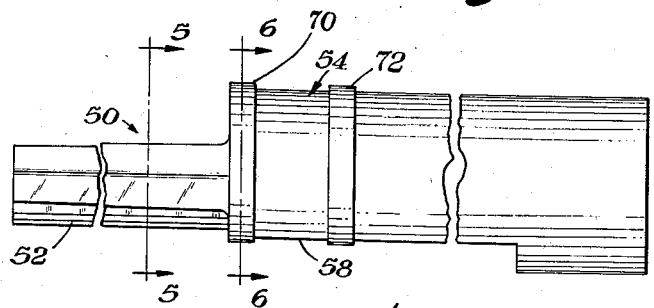
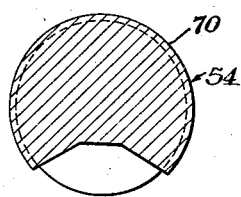
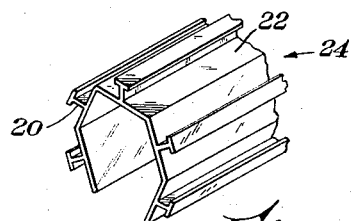
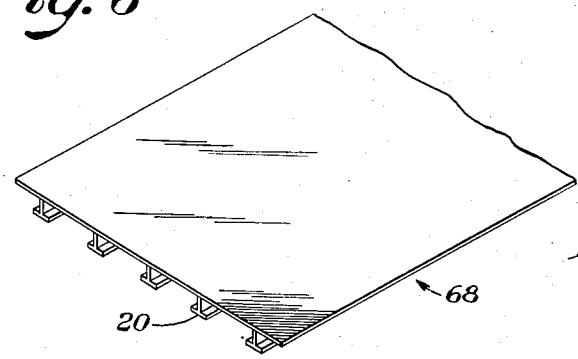

United States Patent Office 2,872,037
Patented Feb. 3, 1959

2,872,037

MANDREL AND DIE

Gerhard Ansel and Clifton J. Huffman, Ferguson, Mo., assignors to The Dow Chemical Company, Midland, Mich., a corporation of Delaware Application May 21, 1954, Serial No. 431,540

2 Claims. (Cl. 207—19)

This invention relates to extrusion apparatus, and particularly to apparatus for extruding a metal section in the form of an open sided polygon by the mandrel process.

Integrally stiffened sheet stringer panels having T and other type stringers are widely used in the aircraft, trucking, and other industries where the light weight and great strength of such metal panels prove beneficial.

Integrally stiffened sheet stringer panels have previously been produced by extrusion of magnesium and aluminum base alloys. Narrow width of integrally stiffened sheet stringer panels no wider than the diameter of available extrusion presses can be extruded in flat form, but the need for greater panel widths has necessitated that wider panel sections be extruded in U, S, or circular configurations which are then straightened and flattened. It can be appreciated that the greatest practical width of panel obtainable from a given die diameter is achieved by first extruding a tube having the stiffening legs or stringers integral with the wall of the tube and then slitting and flattening the tube.

Considerable difficulty has been encountered in flattening such tubular sections because a groove or depression is formed immediately beneath each stringer along the line where it is attached to the panel when the section is flattened. Because of the location of these small depressions on the surface directly opposite the stringers, they cannot be worked out by ordinary methods. Although the depressions are small, they prove troublesome when stringer panels having such depressions are utilized, for example, as wing surfaces for high speed aircraft.

When integrally stiffened sheet stringer panels are utilized as wing surfaces for aircraft, it is desirable that panels having tapered wall thickness be used. (Good design dictates that thinner paneling be utilized on surfaces which are subjected to smaller stresses.) For example, thinner paneling may be used to cover the surfaces of the wing tips of an aircraft, because of the smaller stresses thereon, than is used to cover surfaces near the fuselage. It is desirable, for aerodynamic reasons, that the thickness dimension be tapered gradually rather than in a stepped manner.

It has been possible by using a cylindrical die opening having stringer-forming openings extending radially therefrom and utilizing a tapered cylindrical mandrel to produce sheet stringer panels having tapered thickness, but panels made with such a die and mandrel have been characterized by the depressions previously mentioned when the extrusion is slitted and flattened.

Accordingly, a principal object of this invention is to provide improved extrusion apparatus for producing integrally stiffened sheet stringer panels.

Another object of this invention is to provide improved extrusion apparatus which is adapted to use in the production of integrally stiffened sheet stringer panels which may easily be flattened without forming grooved depressions beneath the stringers.

An additional object of the present invention is to provide improved equipment which may be used to produce open sided polygonal metal sections.

An ancillary object of the invention is to provide an improved interlocking die and mandrel assembly.

Yet another object of this invention is to provide an improved die and mandrel assembly which is useful in making extrusions of polygonal sections having tapering or stepped wall thickness.

In accordance with the present invention, there is provided an interlocking die and mandrel assembly in which a mandrel guide and support extends from the die. Both the die and the mandrel guide and support have a mandrel guiding keyway. The keyways are axially aligned one with another. The die and mandrel guide and support are interlocked with an elongated key part of the mandrel during the process of extruding the panels.

The invention, as well as additional objects and advantages thereof, will best be understood by reading the following detailed description in connection with the accompanying drawings, in which:

Fig. 1 is an isometric view of extrusion tools in accordance with this invention assembled in operative relation but removed from the press cylinder in which they are used;

Fig. 2 is a side elevational view of the extrusion die and integral mandrel guide and support shown in Fig. 1;

Fig. 3 is an end view of the die and the mandrel guide and support of Fig. 2;

Fig. 4 is a side elevational view of the dummy block and mandrel shown in Fig. 1;

Fig. 5 is a sectional view taken along the lines 5—5 of Fig. 4;

Fig. 6 is a sectional view, taken along the line 6—6 of Fig. 4;

Fig. 7 illustrates an extrusion press in which is mounted the extrusion tools shown in Fig. 1;

Fig. 8 is an isometric view of an unflattened stringer panel section as extruded using the equipment shown in Figs. 1 to 7;

Fig 9 is an isometric view of the sheet stringer panel section shown in Fig. 8, after flattening;

Fig. 10 illustrates an alternative arrangement employing tapered pins and tapered apertures for joining the mandrel guide and support to the die, and Fig. 11 illustrates a mandrel guide and support in which the mandrel guiding keyway extends only part way along the length of the mandrel guide and support.

Referring particularly to Figs. 1 and 7, there are shown extrusion tools adapted to be assembled in operative relation in an extrusion press or extrusion apparatus 12. The tools include a cylindrical die 14 having a polygonal metal shaping opening 16 extending therethrough. T-shaped stringer cutouts 18 extend radially outwardly from near the center of all but the lower face of the polygonal opening 16 of the die 14. The cross sectional configuration of the T-shaped stringer cutouts 18 is such that the stringer 20 extruded therethrough (shown in Fig. 8) provides a rigid central backing for the plate-like sides 22 of the extruded polygonal section 24. The end surface 26 of the die 14 is adapted to be socketed in the backer 28 of the press 12 while the pheripheral or cylindrical surface 32 of the die 14 fits within the working cylinder or container 34 of the press 12.

A keyway 36 extends axially through the die 14, being formed in the previously mentioned one face of the polygonal opening 16 in the die 14 which does not have a stringer cutout 18. The keyway 36 is undercut to provide an outward extending lip portion 38 at each side of the keyway 36.

Referring particularly to Figs. 2 and 3, an elongated mandrel guide and support 30 having its cross-section shaped as a truncated segment of a circle, extends from and is joined to the die 14. As illustrated in Figs. 1 and 2, the die 14 and mandrel guide and support 30 are joined together by the screws 40. The arcuate or cylindrical surface 42 of the mandrel supporting guide 30 has the same radius of curvature as does the peripheral cylindrical surface 32 of the cylindrical die 14. The curved peripheral surfaces of the die 14 and the mandrel guide and support 30 are in axial alignment one with another and are adapted to lie in contact with the cylindrical wall of the working cylinder 34 of the press 12 during the extrusion operation. The truncated flat face 44 of the mandrel supporting guide 30 is aligned with the face of the polygonal opening 16 (of the die 14) which his the keyway 36 therein. A keyway 46, identical in cross-section to and in axial alignment with the keyway 36 of the die 14, is provided along the flat upper surface 44 of the mandrel guide and support 30. The sloping side surfaces 48 of the mandrel guide and support 30, as well as other surfaces of the extrusion tools, are ground smooth in order to decrease frictional resistance between the tools and metal billets which are to be extruded through the die 14.

Referring to Figures 1, 4, 5, and 7, a mandrel 50, which is at least as long as the combined length of the die 14 and the mandrel guide and support 30, has a polygonal cross-sectional configuration which is smaller in size but generally corresponding in shape to the cross-sectional configuration of the polygonal opening 16 in the die 14. The lower face of the mandrel 50 has projecting from it a key comprising an inverted generally T-shaped extension 52 along the entire length of the mandrel, the cross member of the T being remote from the mandrel 50. The T-shaped extension 52 is of such cross sectional configuration that it is adapted to fit closely but slideably into the undercut keyways 36 and 46 of the die 14 and mandrel guide and support 30, respectively. One end of the mandrel 50 is secured, as by welding, to a dummy block 54 which is adapted to fit into the working cylinder 34 of the extrusion press 12 ahead of the ram 56. A truncated cylindrical wedge-shaped section of metal is cut or otherwise removed from the lower forward part 58 of the dummy block 54 in order to permit the dummy block 54 to pass over the mandrel guide and support 30 as the mandrel 50 is passed through the die 14. The length of the cutout part of the dummy block 54 equals or exceeds the length of the mandrel guide and support 30. Two lands 70, 72 are provided on the dummy block 54 to insure that the dummy block is properly aligned with respect to the walls of the working cylinder 34.

It should be emphasized that the mandrel 50 need not necessarily be secured to the dummy block 54. While securing the two parts together does facilitate the withdrawal of the mandrel 50 from the die 14, other means to withdraw the mandrel 50 could be used.

Figure 10 illustrates an alternative arrangement for aligning the die 14 and the mandrel guide and support 30. Instead of the two parts being bolted together to achieve alignment, as in the arrangement shown in Figs. 1 and 2, alignment is achieved in the arrangement shown in Fig. 10 by providing tapered apertures 60, for example, in the die 14. The tapered apertures 60 are aligned with corresponding tapered pins 62 which extend outwardly from the end of the mandrel supporting guide 30. This alignment arrangement permits the mandrel guide and support 30 to be conveniently withdrawn, for cleaning purposes, for example, from the extrusion press 30 without also removing the die 14.

Fig. 11 illustrates an alternative form of mandrel guide and support. The mandrel guide and support 30a has a cross-sectional configuration similar to the guide 30 discussed previously but the keyway 46a does not extend over the entire length thereof. The keyway 46a, as such, extends from an intermediate point on the guide and support 30a to the end thereof which abuts against the die 14. The flat surface 64 of the guide and support 30a, however, is aligned with the bottom surface of the keyway 46a in order to provide support to the mandrel 50. Inasmuch as a large part of the force which tends to bend and distort the mandrel 50 is downward towards the surface 64 and the bottom of the keyway 46a, the keyway 46a need extend only part way along the guide and support 30a in order to prevent the bending of the mandrel 50 due to laterally applied forces.

A slotted billet 66, shaped to fit around the mandrel 50 and the mandrel supporting guide, is required for use with the extrusion tools of the assembly. During the extrusion operation, the tools comprising the die 14, mandrel guide and support 30, mandrel 50, and dummy block 54 are inserted, along with a preheated billet 66 which is to be extruded through the die opening 16, into the working cylinder 34 of the extrusion press 12. The die 14 abuts against the backer 28. The mandrel 50 is aligned with the die opening 16 by virtue of the T-shaped extension 52 thereon being slideably engaged with the keyway 46 of the mandrel guide and support 30. The billet 66 is slotted to permit it to fit around the mandrel 50. A longer extruded section may be made, of course, if the slotting of the billet 66 is such that the billet fits closely around the mandrel 50 and the mandrel guide and support 30.

As the ram 56 of the press 12 is advanced towards the die 12, the dummy block 54 and mandrel 50 are forced forward, compressing the billet 66 and forcing metal from the billet 66 to flow through the space between the mandrel 50 and the die 14. The resultant extruded section, as illustrated in Fig. 8, is an open sided polygonal shape and has a T-shaped stringer 20 extending outwardly from the midpoint of each side of the polygon.

The mandrel 50 is provided with a tapered or stepped change in cross-sectional configuration if extruded sections having varying wall thicknesses are to be made. With tapered mandrels, the end of the mandrel 50 which first enters the die 14 normally is smaller in cross-section than the end thereof which is adjacent to the dummy block 54. In Fig. 4 the mandrel 50 is illustrated as being tapered.

Because lateral or rotatory movement of the mandrel 50 is restricted by the interlocking relationship between the die 14, mandrel guide and support 30, the mandrel 50, the thickness of the wall of the extruded section 24 can be closely controlled.

Because the T-shaped stringers 20 extend from a flat portion of the polygonal section, rather than from a curved section as in the prior art method of extruding such sections, the section 24 may easily be straightened with conventional equipment to provide a flat section 68 similar to that shown in Fig. 9, in which there are no grooves or indentations in the wall surface thereof. As mentioned previously, the production of a sheet stringer panel which is free from surface indentations is a considerable advantage when such panels are used in aerodynamic applications. Further, the use of the interlocked mandrel-guide-die assembly permits considerably greater accuracy in controlling the thickness of the panel wall than is practical with a floating mandrel.

More important than the feature of maintaining close control over the wall thickness, however, is the fact that panels having non-cylindrical bore and tapered or stepped wall thickness may be made. This has not been previously possible with any degree of accuracy when floating mandrels have been used in the extrusion of such sections, and spider mandrels are, by their nature, not adapted to the production of sections in which the wall thickness varies.

While the invention has been described in connection with extrusion dies having a polygonal opening in which T-shaped stringer cutouts extend outwardly along the faces thereof, the invention also has utility with dies having metal forming openings of other shapes and in which the stringer cutouts, if present, may be of any chosen form.

That which is claimed is:

1. Extrusion apparatus comprising a die, an axially movable mandrel having a key, and a mandrel supporting guide, said die and said mandrel supporting guide each having a keyway adapted to receive the key of said mandrel in close fitting slideable relation along the longitudinal axis of said keyways, and means for aligning said keyways one with another.

2. Extrusion apparatus adapted to be inserted into the working cylinder of an extrusion press, comprising a cylindrical die having a mandrel guiding keyway and an aperture through which material is to be extruded, a mandrel supporting guide having a mandrel guiding keyway of the same cross-sectional configuration and area as said keyway in said die, the peripheral surface of said guide which is adapted to lie against said working cylinder being of a cylindrical configuration, said die and said guide being secured together with the keyways in axial alignment one with another, and a mandrel and dummy block secured together to form a unitary assembly, said mandrel having a key portion adapted to slideably engage with said keyways, and said dummy block having a portion thereof cut away to permit the said dummy block to pass over said mandrel supporting guide as said mandrel is advanced through said aperture in said die member.

References Cited in the file of this patent

UNITED STATES PATENTS

| | | |
|---|---|---|
| 837,707 | Mouterde | Dec. 4, 1906 |
| 2,221,299 | Jones | Nov. 12, 1940 |
| 2,256,545 | Bothmann | Sept. 23, 1941 |
| 2,681,734 | Braeuninger | June 22, 1954 |
| 2,698,684 | Guiney et al. | Jan. 4, 1955 |
| 2,798,286 | Anderson | July 9, 1957 |

FOREIGN PATENTS

| | | |
|---|---|---|
| 524,529 | Great Britain | Aug. 8, 1940 |
| 881,486 | France | Jan. 28, 1943 |
| 1,040,138 | France | May 20, 1953 |